(12) United States Patent
Jokschas

(10) Patent No.: US 9,511,313 B2
(45) Date of Patent: Dec. 6, 2016

(54) HOLLOW CYLINDRICAL FILTER ELEMENT FOR A LIQUID FILTER

(71) Applicant: MANN+HUMMEL GMBH, Ludwigsburg (DE)

(72) Inventor: Guenter Jokschas, Murrhardt (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 302 days.

(21) Appl. No.: 14/031,450

(22) Filed: Sep. 19, 2013

(65) Prior Publication Data

US 2014/0083928 A1    Mar. 27, 2014

(30) Foreign Application Priority Data

Sep. 21, 2012  (DE) .................. 10 2012 018 662

(51) Int. Cl.
| | |
|---|---|
| *B01D 35/00* | (2006.01) |
| *B01D 29/11* | (2006.01) |
| *B01D 29/13* | (2006.01) |
| *B01D 29/21* | (2006.01) |

(52) U.S. Cl.
CPC .......... *B01D 35/005* (2013.01); *B01D 29/114* (2013.01); *B01D 29/13* (2013.01); *B01D 29/21* (2013.01); *B01D 2201/316* (2013.01)

(58) Field of Classification Search
CPC ....... B01D 29/114; B01D 29/13; B01D 29/21; B01D 29/15; B01D 35/005; B01D 2201/316; B01D 2201/34291; B01D 2201/0415
USPC ................. 210/437–439, 493.2, 450, 497.01
See application file for complete search history.

(56) References Cited

U.S. PATENT DOCUMENTS

| | | | |
|---|---|---|---|
| 4,948,503 A |  | 8/1990 | Baumann et al. |
| 7,543,711 B1 | * | 6/2009 | Stamey et al. ................ 210/435 |
| 2009/0101595 A1 | * | 4/2009 | Allott et al. .................. 210/767 |
| 2009/0139923 A1 |  | 6/2009 | Pfitzer et al. |
| 2009/0184045 A1 | * | 7/2009 | Stamey, Jr. .......... B01D 35/153 |
| | | | 210/235 |
| 2013/0098824 A1 |  | 4/2013 | Volkmer et al. |

FOREIGN PATENT DOCUMENTS

| | | |
|---|---|---|
| DE | 7914318 U1 | 9/1982 |
| DE | 8714656 U1 | 12/1987 |
| DE | 4430341 A1 | 3/1995 |
| DE | 19541965 C1 | 2/1997 |
| DE | 19737699 A1 | 3/1999 |
| DE | 19848978 A1 | 4/2000 |
| EP | 1254692 A1 | 11/2002 |
| WO | 2007028426 A2 | 3/2007 |

OTHER PUBLICATIONS

Search Report of EP 13181940.1-1356 dated Jan. 1, 2014.

* cited by examiner

*Primary Examiner* — Madeline Gonzalez
(74) *Attorney, Agent, or Firm* — James Hasselbeck

(57) ABSTRACT

A hollow cylindrical filter element for a liquid filter is flowed through in radial direction from an exterior of the filter element to an interior of the filter element by a fluid to be filtered. The fluid after filtration is drained from the interior of the filter element in an axial direction of the filter element. The filter element has a closure tube arranged in the interior of the filter element. The closure tube has a diameter that is smaller than a diameter of the interior of the filter element. The closure tube has a fluid-tight wall and the fluid after filtration is drained in the axial direction through the closure tube.

11 Claims, 1 Drawing Sheet

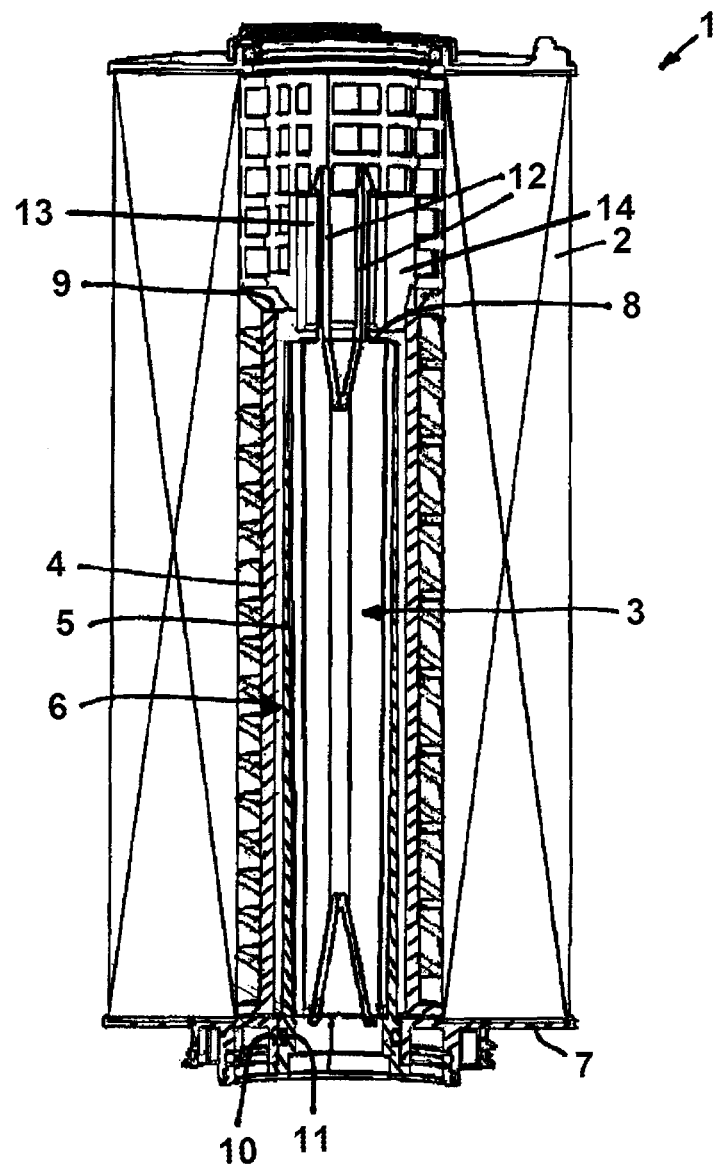

HOLLOW CYLINDRICAL FILTER ELEMENT FOR A LIQUID FILTER

CROSS-REFERENCE TO RELATED APPLICATION

This application claims the benefit of prior filed German patent application No. 10 2012 018 662.2 filed in Germany on Sep. 21, 2012, the entire contents of the aforesaid German patent application being incorporated herein by reference.

BACKGROUND OF THE INVENTION

The invention concerns a hollow cylindrical filter element for a liquid filter, in particular an oil filter for an internal combustion engine, that can be flowed through radially from the exterior to the interior by the fluid to be filtered, wherein the purified (filtered) fluid can be discharged axially via the interior of the filter element.

EP 1 307 274 B1 discloses a liquid filter for lubricant oil of an internal combustion engine that has a hollow cylindrical filter element disposed in a filter housing which is flowed through radially from the exterior to the interior by the oil to be purified (filtered). A support tube or central tube is inserted into the cylindrical interior that represents the clean side. The purified (filtered) oil is drained axially from the interior in downward direction.

When starting the internal combustion engine, the purified (filtered) oil must be available for lubrication as quickly as possible.

SUMMARY OF THE INVENTION

It is therefore an object of the present invention to design a hollow cylindrical filter element for a liquid filter in such a way that purified (filtered) fluid is available in a sufficient quantity immediately after starting the operation of the filter is available.

In accordance with the present invention, this is achieved in that a closure tube having a smaller diameter and comprising a fluid-tight wall is projecting into the interior, wherein the closure tube is connected with the filter element and wherein the purified (filtered) fluid can be drained axially via the closure tube.

The filter element according to the invention is used in liquid filters, for example, oil filters for internal combustion engines. In principle, the filter element can also be used, for example, in a fuel filter.

The hollow cylindrical filter element for the liquid filter is flowed through radially from the exterior to the interior by the fluid to be filtered. The filter element has an interior that is extending in axial longitudinal direction and represents the clean side of the filter element; the fluid that has been purified (filtered) is drained or discharged in axial direction from the interior. In the mounted state, the filter element is inserted into a filter housing of the liquid filter that has inflow and outflow connectors for supply and discharge of the fluid.

Into the interior of the filter element a closure tube is inserted whose outer diameter is smaller than the diameter of the interior so that an annular buffer space is provided between the inner side of the interior and the outer side of the closure tube. The closure tube has a fluid-tight wall so that liquid which is contained in the annular buffer space cannot flow out through the fluid-tight wall of the closure tube. Outflow is possible only when the purified (filtered) fluid, which collects in the annular buffer space, axially reaches a drain opening of the closure tube; this drain opening is expediently an end face opening of the closure tube. The closure tube has advantageously a smaller axial length than the filter element or the interior of the filter element. Upon radial flow of the fluid through the filter element, the fluid collects initially in the annular buffer space at the clean side wherein the level in the buffer space rises axially until it reaches the drain opening in the closure tube. As soon as the level of the purified fluid in the annular buffer space has reached the outflow opening, the fluid can drain in axial direction through the closure tube.

This embodiment has the advantage that after termination of the filtration process the purified (filtered) fluid remains within the annular buffer space and, upon starting the filtration process again, purified (filtered) fluid is available for use after a short period of time.

According to an advantageous embodiment, in the interior of the filter element a support tube, or central tube, is inserted which has a greater diameter than the closure tube and surrounds the closure tube. The annular buffer space is located between the inner side of the central tube and the outer side of the closure tube. In order to prevent return flow of purified (filtered) fluid from the annular buffer space in radial direction outwardly, the central tube can also have a fluid-tight wall across a partial axial length so that the annular buffer space is fluid-tightly closed outwardly in radial direction by means of the central tube as well as inwardly in radial direction by means of the closure tube; outflow is possible only when the level of purified (filtered) fluid in the annular buffer space reaches the outflow opening in the closure tube. The central tube and the closure tube can have fluid-tight walls at least approximately across the same axial length wherein optionally the fluid-tight wall of the central tube projects past the fluid-tight wall of the closure tube. The closure tube and the central tube, according to a further expedient embodiment, can extend at least across half the axial length of the filter element.

The closure tube is fastened within the filter element, in particular by means of the central tube, wherein closure tube and central tube expediently form two different (separate) components which are connected in a suitable way to each other, for example, by means of a locking action. In order to seal off the buffer space in a fluid-tight way, the closure tube is advantageously sealed relative to an annular terminal disk provided at an end face of the filter element. The terminal disk has, for example, a collar which delimits a central cutout and extends in axial direction. A sealing ring is arranged between the collar and the wall surface of the closure tube that is projecting into the collar. This sealing ring, according to a further advantageous embodiment, is inserted into a receiving groove in the wall surface of the closure tube so that a safe immobile seat of the sealing ring is provided. Possible is also an arrangement of the sealing ring in a corresponding receiving groove on the inner wall of the collar which is monolithic with the terminal disk.

BRIEF DESCRIPTION OF THE DRAWING

Further advantages and expedient embodiments may be taken from the claims, the FIGURE description, and the drawing in which a hollow cylindrical filter element for a liquid filter, consistent with the present invention, is illustrated in longitudinal section.

DESCRIPTION OF THE PREFERRED EMBODIMENTS

The filter element 1 illustrated in the only FIGURE is of annular shape or of a hollow cylindrical shape and is used for liquid filtration, for example, in an oil filter in an internal combustion engine. The upright filter element 1 whose longitudinal axis is at least approximately coinciding with the vector of the force of gravity has a filter medium 2 which is flowed through in radial direction from the exterior to the interior by the fluid to be purified. The filter medium 2 surrounds a central cylindrical interior 3 which extends in longitudinal direction through the filter element 1 and represents the clean side. Via the interior 3 the purified (filtered) fluid is drained or discharged axially from the filter element 1.

A support tube or central tube 4 is inserted into the filter element 1 which lines the interior 3. The central tube 4 surrounds a closure tube 5 that is embodied as a separate component and has an outer diameter that is smaller than the inner diameter of the central tube 4 so that an intermediately positioned annular buffer space 6 for receiving the purified (filtered) fluid is formed.

The closure tube 5 is embodied as a separate component that is connected with the central tube 4. The connection is realized by means of locking elements 12 which are embodied as locking webs monolithically formed with the closure tube 5 and which project in axial direction past the upper terminal edge 8 of the closure tube 5. In the area of the free end face of the locking elements 12 locking hooks are monolithically formed that project lockingly through a hollow cylinder 13 of the central tube 4 so that the closure tube 5 is locked on the central tube 4 in axial direction and in circumferential direction. The hollow cylinder 13 is connected by radial ribs 14 with the grid-shaped wall of the central tube 4. For mounting the closure tube 5 on the central tube 4, the locking hooks of the locking elements 12 are passed through the hollow cylinder 13 until they exit at the opposite end face of the hollow cylinder 13 and engage lockingly thereat.

The closure tube 5 has a shorter axial length than the filter element 1 and extends from a lower terminal disk 7 at the end face of the filter element 1 up to about three quarters of the axial length of the filter element 1. The upper terminal edge 8 of the closure tube 5 which has a fluid-tight wall forms the outflow opening by means of which the purified (filtered) fluid flows out of the interior 3 downwardly in axial direction.

The central tube 4 has across an axial partial length a fluid-tight wall which extends from the lower terminal disk 7 up to a point minimally above the terminal edge 8 of the closure tube 5. Across the remaining axial length, the central tube 4 is formed as a grid with intermediate flow spaces by means of which the purified (filtered) fluid can flow radially into the interior 3. The upper terminal edge 9 of the fluid-tight wall of the central tube 4 is positioned slightly above the terminal edge 8 of the closure tube 5.

Between the outwardly positioned fluid-tight wall of the central tube 4 in radial direction and the inwardly positioned fluid-tight wall of the closure tube 5 in radial direction, the annular buffer space 6 is positioned into which the purified (filtered) fluid flows during the filtration process. As soon as the level of the fluid in the annular buffer space 6 has reached the terminal edge 8 of the closure tube 5, the purified (filtered) fluid can flow across the terminal edge 8 into the interior of the closure tube 5 and can be discharged or drained axially via the closure tube 5 in downward direction.

In order to close off in downward direction the annular buffer space 6, a sealing ring 11 is arranged between the outer wall of the closure tube 5 and a collar 10 which is monolithic with the lower terminal disk 7. The collar 10 is cylindrically formed and surrounds the central cutout (outflow opening) in the terminal disk 7 through which the closure tube 5 projects. The closure tube 5 projects past the terminal disk 7; the sealing ring 11 is arranged in a receiving groove which is provided in the wall surface of the closure tube 5 in the area of the section projecting past the terminal disk 7.

While specific embodiments of the invention have been shown and described in detail to illustrate the inventive principles, it will be understood that the invention may be embodied otherwise without departing from such principles.

What is claimed is:

1. A hollow cylindrical filter element for a liquid filter, the filter element adapted to be flowed through in radial direction from an exterior of the filter element to an interior of the filter element by a fluid to be filtered, the filter element having a hollow interior extending from a lower axial end to an opposing upper axial end of the filter element, wherein the fluid after filtration is drained from the interior of the filter element in an axial direction of the filter element, the filter element comprising:
a central tube arranged in the interior of the filter element, the central tube having:
a fluid-tight circumferentially closed lower wall portion of the central tube extending from the lower axial end of the filter element into the hollow interior towards the opposing upper axial end of the filter element (1), the fluid-tight closed wall lower axial portion terminating at an upper terminal edge of the fluid-tight closed wall lower axial portion; and
an upper axial portion of the central tube formed as a tubular grid having radial fluid flow radial openings extending through the tubular grid of the upper axial portion central tube, the upper axial portion of the central tube extending axially from the upper terminal edge towards the upper axial end of the filter element; and
a fluid-tight circumferentially closed wall closure tube arranged at the lower axial end of the filter element in a radial interior of the fluid-tight closed wall lower central tube terminating at an upper terminal edge of the closure tube within the interior of the filter element;
wherein the upper terminal edge of the closure tube forms a discharge opening for fluid to exit the interior of the filter element through the closure tube;
wherein the closure tube has a diameter that is smaller than a diameter of the interior of the filter element,
wherein the fluid after filtration is drained in the axial direction through the closure tube;
wherein the fluid-tight circumferentially closed lower wall portion of the central tube projects upwardly past the fluid-tight circumferentially closed wall closure tube, such that the upper terminal edge of the circumferentially closed lower wall portion of the central tube is arranged at least minimally above the upper terminal edge of the fluid tight circumferentially closed wall closure tube.

2. The filter element according to claim 1, wherein between an inner side of the central tube and an outer side of the closure tube an annular buffer space for the fluid is formed.

3. The filter element according to claim 2, wherein the closure tube is connected to the central tube.

4. The filter element according to claim 3, wherein the closure tube is locked with the central tube;

wherein the closure tube includes locking elements formed on the upper terminal edge of the closure tube, the locking elements projecting axially outwardly beyond the circumferentially closed wall closure tube;

wherein the locking elements have integrally formed locking hooks, the locking hooks lockably engaging the closure tube with the central tube.

5. The filter element according to claim 2, wherein the central tube has a fluid-tight wall extending across an axial partial length of the central tube.

6. The filter element according to claim 5, wherein an axial length of the fluid-tight wall of the closure tube and an axial length of the fluid-tight wall of the central tube are at least approximately identical.

7. The filter element according to claim 5, wherein the fluid-tight wall of the closure tube and the fluid-tight wall of the central tube extend at least across half an axial length of the filter element.

8. The filter element according to claim 1, further comprising
an annular terminal disk arranged on an end face of the filter element,
wherein the closure tube is sealed relative to the terminal disk.

9. The filter element according to claim 8, wherein
the terminal disk has a collar delimiting a central cutout of the terminal disk,
the filter element further comprising
a sealing ring arranged between a wall surface of the closure tube and the collar.

10. The filter element according to claim 9, wherein
the sealing ring is inserted into a receiving groove that is provided in the wall surface of the closure tube.

11. A liquid filter comprising a hollow cylindrical filter element according to claim 1.

* * * * *